(12) United States Patent
Ellis et al.

(10) Patent No.: US 8,377,342 B2
(45) Date of Patent: Feb. 19, 2013

(54) TITANIUM SUBOXIDE POWDERS

(75) Inventors: Keith Ellis, Abertillery (GB); Vaughan Griffiths, Abertillery (GB); David Pugh, Abertillery (GB); Adam Morgan, Abertillery (GB)

(73) Assignee: Atraverda Limited, Abertillery (GB)

( * ) Notice: Subject to any disclaimer, the term of this patent is extended or adjusted under 35 U.S.C. 154(b) by 365 days.

(21) Appl. No.: 12/673,804

(22) PCT Filed: Aug. 19, 2008

(86) PCT No.: PCT/GB2008/002806
§ 371 (c)(1),
(2), (4) Date: Apr. 29, 2010

(87) PCT Pub. No.: WO2009/024776
PCT Pub. Date: Feb. 26, 2009

(65) Prior Publication Data
US 2011/0123867 A1    May 26, 2011

(30) Foreign Application Priority Data
Aug. 23, 2007   (GB) .................................. 0716441.1

(51) Int. Cl.
| H01B 1/02 | (2006.01) |
| C01G 23/04 | (2006.01) |
| H01M 4/13 | (2010.01) |
| H01M 4/36 | (2006.01) |
| H01M 8/10 | (2006.01) |
| H01M 4/48 | (2010.01) |
| H01M 4/02 | (2006.01) |
| C23C 8/00 | (2006.01) |
| B01J 23/50 | (2006.01) |

(52) U.S. Cl. .................. 252/520.2; 423/609; 429/231.5; 429/484; 429/488; 429/523; 429/528; 429/209; 148/421; 502/350

(58) Field of Classification Search ............... 429/231.5, 429/480, 484, 488, 523, 528, 209; 252/520.2, 252/519.33; 423/609, 610; 148/421; 502/350
See application file for complete search history.

(56) References Cited

U.S. PATENT DOCUMENTS

| 5,173,215 A | 12/1992 | Clarke |
| 5,281,496 A | 1/1994 | Clarke |
| 5,521,029 A | 5/1996 | Fiorino et al. |
| 7,541,113 B2 | 6/2009 | Partington |
| 2006/0005745 A1 | 1/2006 | Van Osten et al. |

FOREIGN PATENT DOCUMENTS

| EP | 0478152 A1 | 4/1992 |
| GB | 2371402 A | 7/2002 |
| WO | 2005118480 A1 | 12/2005 |
| WO | 2008037941 A1 | 4/2008 |

OTHER PUBLICATIONS

Skopp et al., "Thermally Sprayed Titanium Suboxide Coatings for Piston Ring/Cylinder Liners under Mixed Lubrication and Dry-running Conditions", Wear, vol. 262, Issues 9-10, Apr. 10, 2007, pp. 1061-1070.
Afir et al., "X-ray Diffraction Study of Ti-O-C System at High Temperature and in a Continuous Vacuum", Journal of Alloys and Compounds, vol. 288, No. 1, Jun. 29, 1999, pp. 124-140.
Storz et al., "Tribological Properties of Thermal-sprayed Magneli-type Coatings with Different Stoichiometries", Surface and Coatings Technology, vol. 140, Issue 2, May 30, 2001, pp. 76-81.
Lynch et al., "Phase Equilibria in the Titanium-Oxygen System", Metallurgical and Materials Transactions B, vol. 28, No. 3, Jun. 1997, pp. 447-453.
Geraghty et al., "Preparation of suboxides in the Ti-O system by reactive sputtering", Thin Solid Films, vol. 40, Jan. 1977, pp. 375-383.
International Search Report, PCT/GB2008/002806, dated Feb. 2, 2009, 4 pages.
Written Opinion, PCT/GB2008/002806, dated Feb. 2, 2009, 5 pages.
Great Britain Search Report, Application No. GB0716441.1, dated Nov. 16, 2007, 3 pages.

*Primary Examiner* — Carlos Barcena
(74) *Attorney, Agent, or Firm* — Senniger Powers LLP

(57) ABSTRACT

A titanium suboxide powder comprising $Ti_4O_7$, $Ti_5O_9$ and $Ti_6O_{11}$, wherein the $Ti_4O_7$, $Ti_5O_9$ and $Ti_6O_{11}$ provide over 92% of the powder, and wherein the $Ti_4O_7$ is present at above 30% of the total powder.

20 Claims, No Drawings

TITANIUM SUBOXIDE POWDERS

REFERENCE TO RELATED APPLICATIONS

This application is the U.S. national stage application of International Patent Application No. PCT/GB2008/002806, filed Aug. 19, 2008, and claims the benefit of GB Application No. 0716441.1, filed Aug. 23, 2007, the entire disclosures of which are incorporated herein by reference.

FIELD OF INVENTION

The present invention relates to a powder useful in the manufacture of plates, tubes or other shaped articles for use in electrochemical devices, such as batteries.

BACKGROUND OF THE INVENTION

It is known that titanium suboxide materials can be used to form plates useful in electrochemical devices, see for example U.S. Pat. No. 4,422,917.

As will be appreciated, certain members of the titanium suboxide family (i.e. $Ti_nO_{2n-1}$) are more electrically conductive and more resistant to corrosion in acidic environments. Indeed, it has been found that for values of n below 4 (i.e. $1 \leq n \leq 3$) there is a tangible reduction of conductivity and corrosion resistance. Accordingly, it is known that values of n below 4 should be minimised in plates for electrochemical cells.

Whilst U.S. Pat. No. 4,422,917 discloses that values of n below 4 should be minimised, there is mentioned no way in which this can be achieved nor is there noted the optimum distribution of suboxide species which should be sought to provide a suitable powder for, inter alia, plates for electrochemical devices.

SUMMARY OF THE INVENTION

It is an object of the invention to provide a powder material which is suitable for inclusion in or use as a principle conductive component of a plate for an electrochemical device, such as a battery, cell or the like.

DETAILED DESCRIPTION OF THE INVENTION

In the first aspect of the present invention there is provided a titanium suboxide powder comprising $Ti_4O_7$, $Ti_5O_9$ and $Ti_6O_{11}$, wherein the $Ti_4O_7$, $Ti_5O_9$ and $Ti_6O_{11}$ provide over 92% of the powder, and wherein the $Ti_4O_7$ is present at above 30% of the total powder.

By providing a powder in which over 92% is comprised of the disclosed three species a low resistance plate, e.g. a plate having a resistance of less than 7 mΩ, can be provided.

By way of contrast, prior art powders which have $Ti_3O_5$ and, in some cases $Ti_9O_{13}$ and/or $TiO_2$, have a resistance of over 7 mΩ when provided as an equivalently sized plate.

Moreover, the present inventors have surprisingly found that providing a powder wherein the $Ti_4O_7$, $Ti_5O_9$ and $Ti_6O_{11}$ provide over 92% of the powder enables electrodes, plates and tubes comprised of said powder to be more resistant to corrosion in acidic conditions than prior art electrodes, plates and tubes.

Furthermore, the plates, tubes, and electrodes prepared from the powders of the invention have a lower weight than those prepared using prior art powders. This is particularly advantageous for their use in electrochemical cells, and in particular in batteries (for example in bipolar batteries). It is especially desirable to provide a battery having improved chemical and physical properties, which is lighter in weight than known batteries.

The powder may comprise from about 30-60% of $Ti_4O_7$ and/or 35 to 60% $\leq Ti_5O_9$.

Preferably, the powder described above comprises
$30\% \leq Ti_4O_7 \leq 60\%$
$35\% \leq Ti_5O_9 \leq 60\%$ and
$2\% \leq Ti_6O_{11} \leq 20\%$.

Preferably, $Ti_4O_7$ is present in the powder in an amount of from 30% to 60% by weight based on the total weight of the powder. Having amounts of $Ti_4O_7$ greater than 60% in the powder is disadvantageous because corrosion resistance may be adversely affected. In contrast if $Ti_4O_7$ is present in less than 30% by weight based on the total weight of the powder, the conductivity of the resulting electrode or shaped article may be adversely affected.

Preferably, $Ti_5O_9$ is present in the powder in an amount of from 35% to 60% by weight based on the total weight of the powder. Having amounts of $Ti_5O_9$ greater than 60% in the powder is disadvantageous due to the higher resistance articles obtained. In contrast if $Ti_5O_9$ is present in less than 35% by weight based on the total weight of the powder, corrosion resistance may be adversely affected due to the higher quantities of $Ti_4O_7$ and $Ti_3O_5$ phases.

In order to maintain the balance between lower electrical resistance and high corrosion resistance the present inventors have found that it is particularly advantageous for $Ti_6O_{11}$ to be present in amounts of less than or equal to 20% by weight, but at least 2% by weight based on the total weight of the powder.

Preferably the $Ti_4O_7$, $Ti_5O_9$ and $Ti_6O_{11}$ provides over 95% of the powder and most preferably over 96%, 97%, 98%, 99%, e.g. 100%.

Preferably the powder comprises less than 5% of a titanium suboxide other than $Ti_4O_7$, $Ti_5O_9$ and $Ti_6O_{11}$ based on the total weight of the powder. More preferably the powder comprises less than 2%, less than 1%, or less than 0.5% of a titanium suboxide other than $Ti_4O_7$, $Ti_5O_9$ and $Ti_6O_{11}$ based on the total weight of the powder.

Preferably the total amount of $Ti_4O_7$, $Ti_5O_9$ and $Ti_6O_{11}$ together with unavoidable impurities totals 100%.

Preferably the sum of $Ti_4O_7$, $Ti_5O_9$ and $Ti_6O_{11}$ provides 100% of the titanium suboxide powder.

Preferably the powder has less than $5\% \leq Ti_3O_5$, more preferably less than 2% and most preferably 0%.

Preferably the powder has less than $5\% \leq Ti_9O_{13}$, more preferably less than 2% and most preferably 0%.

Preferably the powder has less than $5\% \leq TiO_2$, more preferably less than 2% and most preferably 0% based on the total weight of the powder.

It is advantageous to keep the amounts of $TiO_2$, $Ti_3O_5$, $Ti_9O_{13}$, and other titanium suboxides other than $Ti_4O_7$, $Ti_5O_9$ and $Ti_6O_{11}$ at low levels (i.e. less than 5%, more preferably less than 2% and most preferably 0% based on the total weight of the powder). This is because the presence of significant amounts of $Ti_3O_5$, $Ti_9O_{13}$, $TiO_2$ and other titanium suboxides other than $Ti_4O_7$, $Ti_5O_9$ and $Ti_6O_{11}$ results in the conductivity and/or acid corrosion resistance of the plates, tubes and electrodes comprising the powder being adversely affected.

In one embodiment of the present invention the titanium suboxide powder for use in an electrochemical device, comprises from 5 to $20\% \leq Ti_6O_{11}$ and less than $10\% \leq Ti_3O_5$.

The $Ti_4O_7$ may be present in an amount of from 30 to 60%, from 35% to 50%, or from 40% to 50% based on the total weight of the powder.

The $Ti_5O_9$ may be present in an amount of from 35 to 60%, from 35% to 50%, from 50% to 60%, or from 45% to 55% based on the total weight of the powder.

The $Ti_6O_{11}$ may be present in an amount of from 2, or from 5, to 20%, or from 5% to 15% based on the total weight of the powder.

Preferably, the powder of the present invention consists of
30%≦$Ti_4O_7$≦60%
35%≦$Ti_5O_9$≦60%
2%≦$Ti_6O_{11}$≦20% and any unavoidable impurities.

In one embodiment of the present invention the powder comprises
26%≦$Ti_4O_7$≦60%
35%≦$Ti_5O_9$≦60% and
2%≦$Ti_6O_{11}$≦20%
wherein the $Ti_4O_7$, $Ti_5O_9$ and $Ti_6O_{11}$ provides over 92% of the powder.

In an alternative embodiment of the present invention the powder comprises
35%≦$Ti_4O_7$≦50%
50%≦$Ti_5O_9$≦60% and
5%≦$Ti_6O_{11}$≦20%
wherein the $Ti_4O_7$, $Ti_5O_9$ and $Ti_6O_{11}$ provide over 92% of the powder.

In an alternative embodiment of the present invention the powder comprises
40%≦$Ti_4O_7$≦50%
45%≦$Ti_5O_9$≦55% and
5%≦$Ti_6O_{11}$≦15%
wherein the $Ti_4O_7$, $Ti_5O_9$ and $Ti_6O_{11}$ provide over 92% of the powder.

The powder of the present invention may be prepared by conventional methods which will be well known to those skilled in the art for example by methods such as those described in International patent application no. PCT/GB2005/002172 or U.S. Pat. No. 4,422,917. International patent application no. PCT/GB2005/002172 and U.S. Pat. No. 4,422,917 are herein incorporated by reference.

The compositions of the powders may be measured by conventional X-ray diffraction methods.

In the second aspect of the present invention there is provided an electrode comprising a powder as described herein.

Preferably the electrode comprises a powder as described herein and a polymer and/or a resin. The polymer may be a thermoplastic or thermoset polymer. Preferably the resin is a thermoset resin. More preferably the thermoset resin is an epoxy.

In the third aspect of the present invention there is provided a plate or tube for use in an electrochemical device comprising a powder as described herein.

Preferably the plate or tube comprises a powder as described herein and a polymer and/or a resin. The polymer may be a thermoplastic or thermoset polymer. Preferably the resin is a thermoset resin. More preferably the thermoset resin is an epoxy.

In a preferred embodiment the plate or tube comprises the powder as described herein in less than 70 w/w %, based on the total weight of the plate or tube. More preferably the plate or tube comprises the powder as described herein in the range 55 to 70 w/w %, or from 60 to 65 w/w %. The present inventors have found that the higher the content of the powder of the present invention, generally the higher the conductivity of the product. However using high levels of the powder in the plate or tube, for example greater than 70 w/w % based on the total weight of the plate or tube, may result in the mechanical strength of the plate or tube being adversely affected.

Preferably the plate or tube for use in an electrochemical device has a thickness of less than 5 mm, preferably less than or equal to 2 mm and most preferably less than or equal to 1 mm and a resistance of less than 35 mΩ, preferably less than 7.0 mΩ, preferably less than 6.8 mΩ, the plate comprising pressed powder as previously described.

Preferably, the plate or tube as described above has a wall thickness of less than 2 mm, preferably 1 mm or less and preferably has a weight of less than 55 g.

Preferably the plate has less than 70 w/w % of the powder as previously described, the rest may be provided by binders, such as thermoset or thermoplastic resins, fillers, other conductive species and so on, although preferably a plate will comprise powder of the invention and thermoset resins.

The plate preferably weighs less than 60 g, preferably less than 50 g with an area of 131 $cm^2$.

The plates may have any area. Some suitable plates may have an area of 515 $cm^2$.

The resin may be selected from a wide variety of materials. Preferred are thermoset resins. One suitable resin to manufacture a corrosion resistant plate is an uncured epoxy such as Araldite® PY307-1, in conjunction with HY3203® hardener, both materials being available from Vantico Ltd (Now Huntsman). This has been found to be particularly resistant to anodic corrosion and to make a pore free plate, although other resin systems will produce satisfactory products. Thermoset resins are particularly suitable for the manufacturing of good conductivity plates since they are handled in a hot press, which also presses the particles together for intimate electronic contact, and they also shrink somewhat on curing, further pushing the particles together. Other suitable thermoset resins include epoxyphenols, novolac resins, bisphenol A based epoxy resins, bisphenol F epoxy resins; polyesters (saturated, unsaturated, isophthalic, orthophthalic, neopentylglycol modified, modified vinylester, vinylester urethane and the like. The chosen resin will preferably be one which is resistant to the electrolyte acid, especially where the electrode is for bipolar batteries.

In one embodiment of the present invention there is provided a battery, preferably a bipolar battery, comprising an electrode comprised of the powder as described herein.

In order that the invention may be more fully understood reference is made to the following, non-limiting examples.

COMPARATIVE EXAMPLE

Titanium suboxide powders were made in accordance with the teaching of U.S. Pat. No. 4,422,917, whereby $TiO_2$ powder was reduced in a hydrogen atmosphere at 1180° C. for 8 hours.

The powder was analysed and was found to have the following composition:

TABLE 1

Percentage composition of prior art powders

| Powder | n | | | | | | $TiO_2$ |
| --- | --- | --- | --- | --- | --- | --- | --- |
| | 3 | 4 | 5 | 6 | 7 | 8 | |
| 1 | 4 | 35 | 31 | 22 | 6 | 1 | 1 |
| 2 | 2 | 40 | 30 | 21 | 7 | 2 | 0 |
| 3 | 4 | 33 | 28 | 25 | 8 | 1 | 1 |
| 4 | 3 | 38 | 27 | 25 | 5 | 1 | 1 |
| 5 | 2 | 37 | 27 | 26 | 6 | 1 | 1 |

The powders were formed into plates by mixing with an organic binder, shaping to form a plate and curing the binder.

The plates had the following characteristics, which values are an average of the five plates.

TABLE 2

Characteristics of plates made using prior art powders.

| | |
|---|---|
| Powder Content/% | 60.2 |
| Weight/g | 51.1 |
| Thickness/mm | 1.0 |
| Resistance/mΩ | 7.4 |

Resistance is measured using a DC 4 wire technique, using a 3.5 mm crown outer probe/spear inner Kelvin probes (Coda Systems PK3Qb-3.5). Force is applied to the probes using a mechanical jig to ensure consistent probe pressure. A 1 mA current is sourced through the plate and resulting voltage measured using a NI FlexDMM PXI-4072. Resistance is measured five times and an average taken.

Example 1

The following powders were prepared.

TABLE 3

Percentage Composition of Powders

| | n | | |
|---|---|---|---|
| Powder | 4 | 5 | 6 |
| 1 | 36 | 52 | 12 |
| 2 | 39 | 49 | 12 |
| 3 | 47 | 45 | 8 |

The powders were made into plates mixing with an organic binder, shaping to form a plate and curing the binder.

The so formed plates had the following characteristics, which values are an average of the three plates.

TABLE 4

Characteristics of plates

| | |
|---|---|
| Powder Content/% | 62 |
| Weight/g | 48 |
| Thickness/mm | 1.0 |
| Resistance/mΩ | 6.7 |

Resistance is measured using a DC 4 wire technique, using a 3.5 mm crown outer probe/spear inner Kelvin probes (Coda Systems PK3Qb-3.5). Force is applied to the probes using a mechanical jig to ensure consistent probe pressure. A 1 mA current is sourced through the plate and resulting voltage measured using a NI FlexDMM PXI-4072. Resistance is measured five times and an average taken.

As will be appreciated the plates prepared from the powders 5, of the invention have a significantly lower resistance than those fabricated from prior art powders and they have a lower weight. Both of these factors mitigate to make bipolar batteries made using the powder of the invention preferable to those made with powder formed according to the prior art because of their higher conductivity and lower overall weight.

Whilst we do not wish to be bound by any particular theory, it is postulated that the decrease in resistance is due to the tighter distribution of suboxide species and the total exclusion of $Ti_3O_5$.

Example 2

TABLE 5

Percentage Composition of Powders and Corrosion Data

| Powder Sample No. | Composition | Soluble Ti content (mg/l) |
|---|---|---|
| 1 | 55% $Ti_4O_7$ 36% $Ti_5O_9$ 9% $Ti_6O_{11}$ | 89 |
| 2 | 14% $Ti_3O_5$, 86% $Ti_4O_7$ | 1290 |
| 3 | 100% $Ti_3O_5$ | 6750 |

The above powders were prepared in accordance with the teaching of U.S. Pat. No. 4,422,917, whereby $TiO_2$ powder was reduced in a hydrogen atmosphere at 1180° C. for 8 hours. 25 g of each powder sample was immersed in 40% w/w sulphuric acid for 72 hours at 71° C. Analysis by ICP-OES (Inductively Coupled Plasma-Optical Emission Spectroscopy) measured the amount of soluble Ti content in the sample.

Whilst we have disclosed that the powder of the invention may be used as a component of a plate for an electrochemical device, it may also be formed as a tube for use as an electrode, and is also considered that the powder has utility as a powder for plasma and/or flame spraying, as a conductive additive, e.g. in plastics or inks, as a catalyst support in fuel cells and other uses where low resistance and/or chemical stability are required.

In this specification, unless otherwise stated all percentage terms are given as weight as a proportion of weight (w/w %).

The invention claimed is:

1. A titanium suboxide powder comprising $Ti_4O_7$, $Ti_5O_9$ and $Ti_6O_{11}$, wherein the $Ti_4O_7$, $Ti_5O_9$ and $Ti_6O_{11}$ provide over 92% by weight of the powder, and wherein the $Ti_4O_7$ is present at above 30% by weight of the total powder.

2. The powder according to claim 1, wherein the $Ti_4O_7$, $Ti_5O_9$ and $Ti_6O_{11}$ constitute over 95% by weight of the powder.

3. The powder according to claim 1, wherein the powder comprises less than 5% by weight of a titanium suboxide other than $Ti_4O_7$, $Ti_5O_9$ and $Ti_6O_{11}$ based on the total weight of the powder.

4. The powder according to claim 1, wherein the total amount of $Ti_4O_7$, $Ti_5O_9$ and $Ti_6O_{11}$ together with unavoidable impurities totals 100% by weight.

5. The powder according to claim 1, wherein the $Ti_4O_7$, $Ti_5O_9$ and $Ti_6O_{11}$ constitute 100% by weight of the powder.

6. The powder according to claim 1 being free of $Ti_3O_5$.

7. A titanium suboxide power according to claim 1 comprising
30%<$Ti_4O_7$≦60% by weight
35%<$Ti_5O_9$≦60% by weight and
2%<$Ti_6O_{11}$≦20% by weight.

8. A titanium suboxide power according to claim 1 consisting of
30%<$Ti_4O_7$≦60% by weight
35%≦$Ti_5O_9$≦60% by weight and
2%≦$Ti_6O_{11}$≦20% by weight.

9. A titanium suboxide powder comprising $Ti_4O_7$, $Ti_5O_9$ and $Ti_6O_{11}$ wherein
30%≦$Ti_4O_7$≦60% by weight
35%≦$Ti_5O_9$≦60% by weight and
2%≦$Ti_6O_{11}$≦20% by weight.

10. A titanium suboxide power consisting of
30%≦$Ti_4O_7$≦60% by weight
35%<$Ti_5O_9$≦60% by weight and
2%<$Ti_6O_{11}$≦20% by weight.

11. An electrode comprising a powder as defined in claim 1.

12. The electrode according to claim 11, further comprising a polymer and/or a resin.

13. A plate or tube for use in an electrochemical device comprising a powder as defined in claim 1.

14. The plate or tube for use in an electrochemical device according to claim 13, further comprising a polymer and/or a resin.

15. The plate or tube for use in an electrochemical device according to claim 13, wherein said powder is present at less than 70 w/w %.

16. The plate or tube for use in an electrochemical device according to claim 13 having a wall thickness of less than 5 mm and a resistance of less than 35 mΩ.

17. The plate or tube for use in an electrochemical device according to claim 16, having a wall thickness of less than 2 mm.

18. The plate or tube for use in an electrochemical device according to claim 17, having a weight of less than 55 g.

19. The plate or tube for use in an electrochemical device according to claim 16, having a wall thickness of 1 mm or less.

20. The plate or tube for use in an electrochemical device according to claim 16, having a weight of less than 55 g.

* * * * *